United States Patent [19]

Ishikawa et al.

[11] Patent Number: 5,734,461
[45] Date of Patent: Mar. 31, 1998

[54] PHOTOGRAPHIC IMAGE EXPOSING APPARATUS

[75] Inventors: Masazumi Ishikawa; Toru Tanibata, both of Wakayama, Japan

[73] Assignee: Noritsu Koki Co., Ltd., Wakayama, Japan

[21] Appl. No.: 783,985

[22] Filed: Jan. 15, 1997

[30] Foreign Application Priority Data

Jan. 17, 1996 [JP] Japan .................... 8-006161

[51] Int. Cl.$^6$ .......... G03B 27/52; G03B 27/58; G03B 27/72
[52] U.S. Cl. .......... 355/40; 355/39; 355/71; 355/74
[58] Field of Search .................... 355/1, 39, 40, 355/41, 71, 72, 74

[56] References Cited

U.S. PATENT DOCUMENTS

| | | | |
|---|---|---|---|
| 5,337,119 | 8/1994 | Tanibata | 355/40 |
| 5,428,422 | 6/1995 | Tanibata | 355/40 |
| 5,488,450 | 1/1996 | Tanibata | 355/41 |
| 5,602,618 | 2/1997 | Tanibata | 355/40 |

*Primary Examiner*—A. A. Mathews
*Attorney, Agent, or Firm*—Jordan and Hamburg

[57] ABSTRACT

A photographic image exposing apparatus capable of surely cutting off light leaked from an exposing head to avoid deterioration of quality of an image after projected. The photographic image exposing apparatus includes a first exposing section, provided at a position over a transporting path of a photographic paper, for projecting an image of a negative film on an area of the photographic paper to expose the photographic image thereon; and a second exposing section, provided at a position over the transporting path of the photographic paper, for exposing a photographic image captured as image data on a different area of the photographic paper from the area of the photographic paper exposed by the first exposing section, said second exposing section comprising a light source; an exposing head for outputting light of the light source onto the photographic paper to expose the photographic image thereon; and a light shielding mask for opening and closing an optical path between the light source and the exposing head.

6 Claims, 7 Drawing Sheets ly related to a photographic image exposing apparatus comprising a first exposing section for projecting a photographic image of a negative film onto an area of a photographic paper to expose the photographic image thereon and a second exposing section for projecting a photographic image captured as image data onto a different area of the photographic paper from the area of the photographic paper exposed by the first exposing section to expose the photographic image thereon.

PHOTOGRAPHIC IMAGE EXPOSING APPARATUS

BACKGROUND OF THE INVENTION

1. Field of the Invention

The present invention relates to a photographic image exposing apparatus comprising a first exposing section for projecting a photographic image of a negative film onto an area of a photographic paper to expose the photographic image thereon and a second exposing section for projecting a photographic image captured as image data onto a different area of the photographic paper from the area of the photographic paper exposed by the first exposing section to expose the photographic image thereon.

2. Description of the Related Art

Recently, photographic image exposing apparatuses have been adopted such that after a photographic image of a negative film is projected onto a photographic paper, a photographic image including such as a photo shooting date, a comment and the like, captured as image data, is exposed on a blank space or equivalent of the photographic paper. In these photographic image exposing apparatuses, an exposing section for exposing the photographic image captured as image data comprises a light source and an exposing head comprising a shutter array for outputting light of the light source onto the photographic paper to expose the photographic image on the photographic paper.

The shutter array is formed by a PLZT element of a transparent, ferroelectricity ceramic material produced by adding lanthanum to lead zirconate titanate, for example. When a driving voltage is applied to shutter portions at a position corresponding to picture elements of the image data, the shutter portions are opened to irradiate the light introduced into the shutter portions onto the photographic paper, to allow the photographic paper to be exposed by the light.

However, the photographic image exposing apparatuses thus constructed have a drawback that the exposing head including the shutter array can accidentally permit a slight leak of light from the light source even when no driving voltage is applied to the shutter portions, leading the photographic paper to be accidentally exposed by the leaked light to deteriorate the quality of exposure. In particular, even in a case where color development of the photographic paper cannot be caused solely by the leaked light, if the leaked light overlays a location for the negative film to be exposed on, the photographic paper may be accidentally sensitized to deteriorate the quality of image.

SUMMARY OF THE INVENTION

The object of the invention is to provide a photographic image exposing apparatus capable of surely preventing the light from being leaked from the exposing head to avoid deterioration of quality of an image after projected.

To achieve the object, the photographic image exposing apparatus according to the invention comprises transporting means for transporting a photographic paper in a fixed direction; a first exposing section, provided at a position over a transporting path of the photographic paper, for projecting a photographic image of a negative film on an area of the photographic paper to expose the photographic image thereon; and a second exposing section, provided at a position over the transporting path of the photographic paper, for exposing a photographic image captured as image data on a different area of the photographic paper from the area of the photographic paper exposed by the first exposing section, said second exposing section comprising a light source; an exposing head for outputting light of the light source onto the photographic paper to expose the photographic image thereon; and light shielding means for opening and closing an optical path between the light source and the exposing head.

The photographic image exposing apparatus thus constructed permits the optical path between the light source and the exposing head to be shielded by the light shielding means, rendering the photographic paper to be prevented from being sensitized accidentally to thereby avoid deterioration of quality of an image after projected on the photographic paper.

In the above-mentioned photographic image exposing apparatus, the light shielding means may comprise a light shielding member and moving means for allowing the light shielding member to be movable into and away from between the light source and the exposing head.

In this case, the light shielding member can be moved into a space between the light source and the exposing head by the moving means to shield the optical path therebetween, rendering the photographic paper to be prevented from being sensitized accidentally to thereby avoid deterioration of quality of the image after projected on the photographic paper.

Alternatively, the photographic image exposing apparatus according to the invention may comprise transporting means for transporting a photographic paper in a fixed direction; a first exposing section, provided at a position over a transporting path of the photographic paper, for projecting a photographic image of a negative film on an area of the photographic paper to expose the photographic image thereon; and a second exposing section, provided at a position over the transporting path of the photographic paper, for exposing a photographic image captured as image data on a different area of the photographic paper from the area of the photographic paper exposed by the first exposing section, said second exposing section comprising a light source; an exposing head for outputting light of the light source onto the photographic paper to expose the photographic image thereon; and light shielding means for opening and closing an optical path between the exposing head and the photographic paper.

The photographic image exposing apparatus thus constructed allows the optical path between the exposing head and the photographic paper to be shielded by the light shielding means, rendering the photographic paper to be prevented from being sensitized accidentally to thereby avoid deterioration of quality of an image after projected on the photographic paper.

In the immediately above-mentioned photographic image exposing apparatus, the light shielding means comprises a light shielding member and moving means for allowing the light shielding member to be movable into a space between the exposing head and the photographic paper, the light shielding member being adapted to be movable along a widthwise direction of the photographic paper intersecting a transporting direction of the same, to shield the area of the photographic paper exposed by the first exposing section against light.

In this case, the light shielding member can be moved along the widthwise direction of the photographic paper into a space between the exposing head and the photographic paper by the moving means. This renders the photographic paper to be prevented from being sensitized accidentally to avoid deterioration of quality of the image after projected on the photographic paper.

Further, the above-mentioned photographic image exposing apparatus may be modified such that the light shielding means comprises a light shielding member and moving means for allowing the light shielding member to be movable into a space between the exposing head and the photographic paper, the light shielding member being adapted to be movable along a longitudinal direction of the photographic paper extending along the transporting direction of the same, to shield the area of the photographic paper exposed by the first exposing section against light.

In this modification, the light shielding member can be moved along the longitudinal direction of the photographic paper into a space between the exposing head and the photographic paper by the moving means to shield the optical path therebetween. This enables the photographic paper to be prevented from being sensitized accidentally to thereby avoid deterioration of quality of the image after projected on the photographic paper.

Further, the photographic image exposing apparatus may further comprise light shielding means comprising a second light shielding member and moving means for allowing the second light shielding means to be movable into a space between the exposing head and the photographic paper.

The photographic image exposing apparatus thus constructed permits not only the optical path between the light source and the exposing head to be shielded by the light shielding means but also the optical path between the exposing head and the photographic paper to be shielded by the second light shielding means. This further ensures the photographic paper to be prevented from being sensitized accidentally to thereby avoid deterioration of quality of the image after projected on the photographic paper.

The above and other objects, features and advantages of the present invention will become more apparent upon reading of the following detailed description and drawings.

DETAILED DESCRIPTION OF THE PREFERRED EMBODIMENT

Referring to the accompanying drawings, the embodiments of the invention will be described below.

Figure 1:
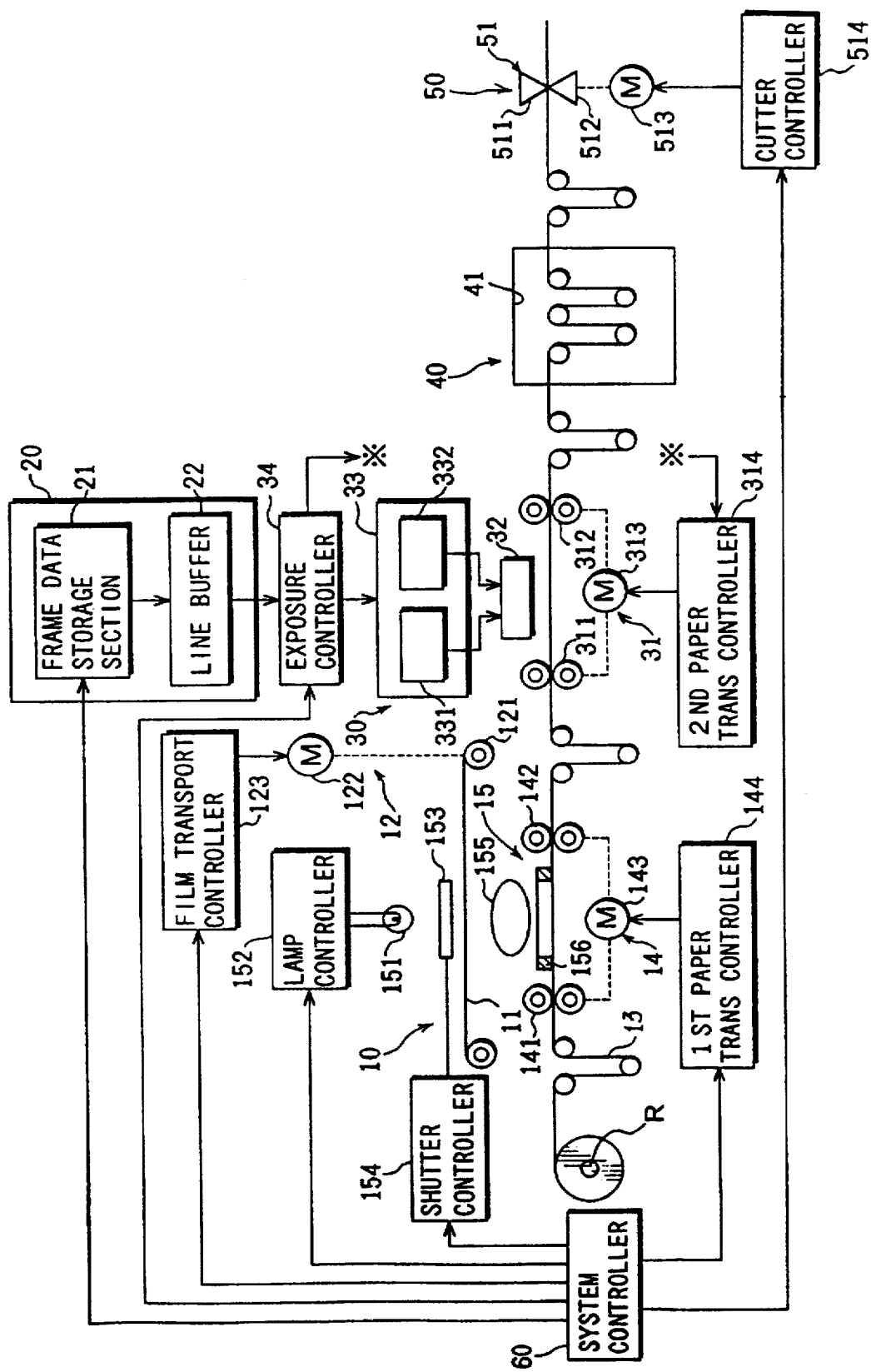
FIG. 1 is a schematic diagram of construction of an automatic photo printing system to which a photographic image exposing apparatus of the invention is applied.

FIG. 1 is a schematic diagram of construction of an automatic photo printing system to which a photographic image exposing apparatus of the invention is applied. In FIG. 1, the automatic photo printing system comprises a first exposing section 10 for projecting a photographic image of a negative film onto an area (also referred to as a first area) of a photographic paper to expose the photographic image thereon; an image data capturing section 20 for capturing a photographic image in each frame, such as a photo shooting date, a caption and the like, read from a magnetic recording section or equivalent of the negative film, and storing the photographic image as image data; a second exposing section 30 for converting the image data in the image data capturing section 20 into a light signal and exposing it on a different area (also referred to as a second area) of the photographic paper from the area of the photographic paper exposed by the first exposing section 10; a developing section 40 for developing the exposed photographic paper; a cutting section 50 for cutting the developed and dried photographic paper into each individual frame; and a system controller 60 for controlling operations of the entire system.

The first exposing section 10 comprises a film transporting section 12 for transporting each frame of the developed negative film 11 to an exposing position; a first photographic paper transporting section 14 for transporting a rolled, elongate, photographic paper 13 wound on a roll R to a first exposing position; and an exposure processing section 15 for exposing the photographic image in each of the frames of the negative film 11 on the rolled photographic paper 13.

The film transporting section 12 includes a winding roller 121, a driving motor 122 for rotationally driving the winding roller 121, and a film transport controlling section 123 for controlling the drive of the driving motor 122. The driving motor 122 is rotated under control of signals from the film transport controlling section 123, to intermittently transport the negative film 11 frame by frame to the exposing position via the winding roller 121.

The first photographic paper transporting section 14 includes a first pair of transport rollers 141 provided at a position upstream of the exposing position, a second pair of transport rollers 142 provided at a position downstream of the exposing position, a driving motor 143 for rotationally driving the first and second pairs of transport rollers 141, 142, and a first photographic paper transport controlling section 144 for controlling the drive of the driving motor 143. The driving motor 143 is rotated under control of signals from the first photographic paper transport controlling section 144, to intermittently transport the rolled photographic paper 13 frame by frame, timing the transporting action to the exposing action.

The exposure processing section 15 includes a lamp 151 disposed above the negative film 11, a lamp controlling section 152 for controlling light amounts emitted from the lamp 151, a shutter 153 interposed between the lamp 151 and the negative film 11, a shutter controlling section 154 for controlling the opening and closing of the shutter 153, a lens 155, interposed between the negative film 11 and the rolled photographic paper 13, for forming an image on the rolled photographic paper 13, and a light shielding mask 156 disposed at the exposing position of the rolled photographic paper 13. The images in the negative film 11 transported via the film transporting section 12 are exposed on the rolled photographic paper frame by frame by opening and closing the shutter 153. The light shielding mask 156 operates to shield an area of the rolled photographic paper 13 to be exposed at the second exposing section, mentioned later, not to be exposed by the light of the lamp 151.

The image data capturing section 20 includes a frame data storage section 21 for capturing a photographic image in each frame, such as a photo shooting date, a photo shooter's name, a location of photo shooting, a caption and the like, read from a magnetic recording portion or equivalent of the negative film 11 and storing it as image data; and a line buffer 22 for reading one line of image data on the photographic image to be exposed in the second exposing section 30 from the frame data storage section 21 and storing it temporally.

The second exposing section 30 includes a second photographic paper transporting section 31 for transporting the rolled photographic paper 13, on which the images in the film were exposed in the first exposing section 10, to a position of the shutter array of the exposing head portion mentioned later; an exposing head portion 32 for exposing the rolled photographic paper 13; an exposing head controlling section 33, comprising a color filter controlling section 331 and an image data output controlling section 332 both for controlling the exposing head portion 32; and an exposure controlling section 34 for synchronously controlling the second photographic paper transporting section 31 and the exposing head controlling section 33 on the basis of the image data delivered from the line buffer 22.

The second photographic paper transporting section 31 includes a first pair of transporting rollers 311 and a second pair of transporting rollers 312, which are located upstream and downstream from the exposing head portion 32, respectively, a driving motor 313 for rotationally driving the first and second pairs of rollers 311, 312, and a second photographic paper transport controlling section 314 for controlling the drive of the driving motor 313. The driving motor 313 is rotated under control of signals from the second photographic paper transport controlling section 314, to transport the rolled photographic paper 13 by a width corresponding to one line of image data at a time, in response to the time required for the one line of image data to be exposed. This allows the exposing head 32 to expose the rolled photographic paper 13 sequentially by one line at a time, with a timing corresponding to the rate at which the rolled photographic paper 13 is transported. The exposure is made several times to complete the exposure of the image corresponding to that in each frame, such as a photo shooting date and the like.

Figure 2:
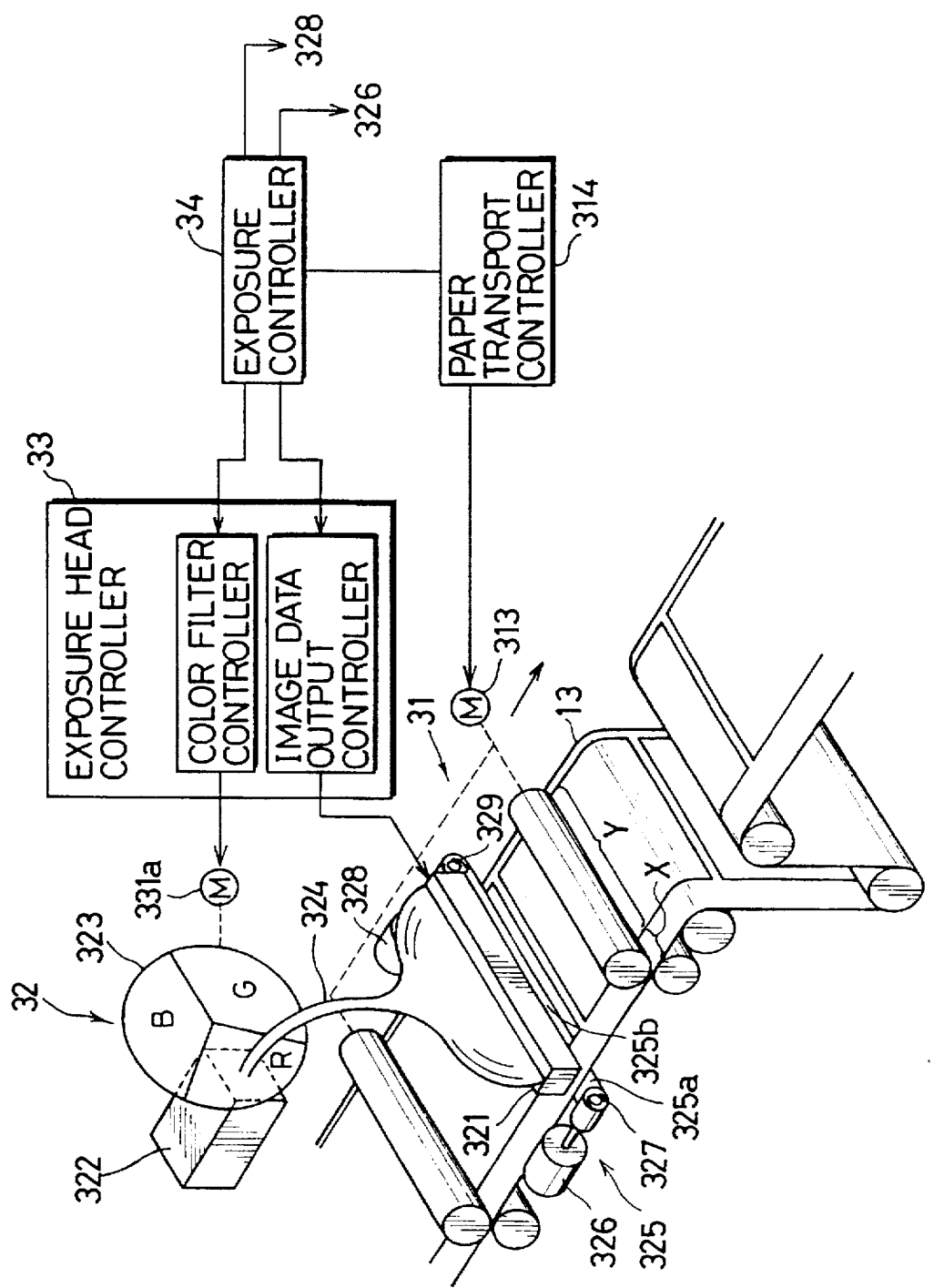
FIG. 2 is an explanatory view of an exposing head portion of the automatic photo printing system shown in FIG. 1.

The exposing head portion 32 operates to convert the image data into light signals and output them onto the rolled photographic paper 13. The exposing head portion 32 includes, as shown in FIG. 2, a shutter array 321 comprising a PLZT element as an exposing head provided along a widthwise direction of the rolled photographic paper 13; a white light source 322; a disc-like color filter 323 having three color regions of R, G, B provided between the shutter array 321 and the white light source 322; bundles of optical fibers 324 for allowing the light of the white light source 322 to pass through the color regions of the disc-like color filter 323 to be delivered to the shutter array 321; and an light shielding mask 325 provided between the shutter array 321 and the rolled photographic paper 13.

Figure 3B:
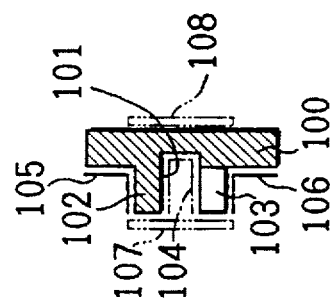
FIG. 3 is an explanatory view of construction of a shutter array comprising a PLZT element, FIG. 3A showing a plan view of the shutter array and FIG. 3B showing a side sectional view of the same.
Figure 3A:
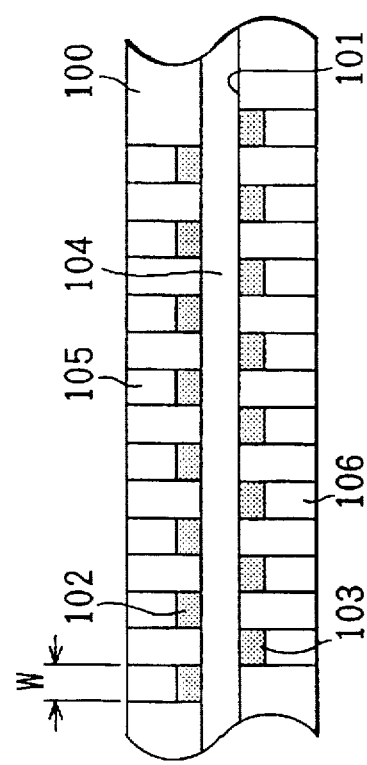

The shutter array 321 comprising the PLZT element is made of a transparent, ferroelectricity ceramic material produced by adding lanthanum to lead zirconate titanate, to utilize electro-optics effect involved in the material. In the shutter array 321, for example a number of projections 102, 103 are formed, with displaced from each other by half pitch, as shown in FIGS. 3A, 3B, at both sides of a groove 101 formed at a lengthwise center portion of the elongate PLZT element 100. A common electrode 104 is provided in the groove 101 and on first surfaces of the projections 102, 103 on the side of the groove 101. Driving electrodes 105, 106 are formed on second surfaces opposite to the first surfaces of the projections 102, 103 and on flat surface portions of the PLZT element 100. Polarization films 107, 108, whose planes of polarization are made orthogonal to each other, are provided at the projection 102, 103 side of the PLZT element 100 and at the bottom side of the same, respectively.

This constructed shutter array 321 permits light incident from the polarization film 108 side to be transmitted toward the polarization film 107 through the projections 102, 103, when required levels of voltage for the colors of R, G, B are applied to between the common electrode 104 and the driving electrodes 105, 106, but permits the light to be cut off, when the application of the voltage is stopped. Thus, the portions of the projections 102, 103 on the polarization film 107 side (the dotted parts in FIG. 3A) form shutter portions for making on-off control on the transmission of light. This provides the result that when the driving voltage is applied to the shutter portions at a position corresponding to picture elements of the image data, the related shutter portions are opened to throw the light of the white light source 322, which passed through the disc-like color filter 323, onto the rolled photographic paper 13, allowing the rolled photographic paper 13 to be exposed by the light.

The number of the shutter portions of the shutter arrays 321 correspond to the number of the picture elements in one line of image data. The exposure controlling section 34 delivers the one line of image data delivered from the line buffer 22 to the image data output controlling section 332, which in turn supplies the driving voltage to the shutter portions corresponding to the delivered image data.

The white light source 322 includes a tungsten halogen lamp and a mirror tunnel through which the light of the lamp is introduced into the bundles of optical fibers 324. The light of the white light source stays "on" whenever the automatic photo printing system is in operation. The disc-like color filter 323 is divided into three color regions in the order of B, G, R along the circumferential direction and is rotated along the circumferential direction at a constant speed.

The light shielding mask 325 allows an area of the photographic paper to be exposed by the second exposing portion 30 not to be shielded but allows the area of the photographic paper 13 exposed by the first exposing section 10 to be protected against the light leaked from the shutter array 321. In this embodiment, one widthwise end portion X of the rolled photographic paper 13 directly under the shutter array 321 is bared but the remaining part Y of the photographic paper is shielded. The light shielding mask 325 comprises a first mask member 325a and a second mask member 325b which are light shielding members provided at both widthwise ends of the rolled photographic paper 13.

The first and second mask members 325a, 325b are made of a thin metal belt or equivalent. The first mask member 325a is so wound on a roller 327, which is rotatably driven by a driving motor 326, as to be freely drawn out. The second mask member 325b is so wound on a roller 329, which is rotatably driven by a driving motor 328, as to be freely drawn out. In this embodiment, since the end portion X of the rolled photographic paper 13 is bared but the remaining part Y is shielded, only the second mask member 325b is drawn out from the roller 329. The first mask member 325a, the second mask member, 325b and the driving motors 326, 328 are main components of the light shielding means for opening and closing an optical path between the white light source 322 and the rolled photographic paper 13. The driving motors 326, 328 form moving means for the first and second mask members 325a, 325b.

Figure 4:
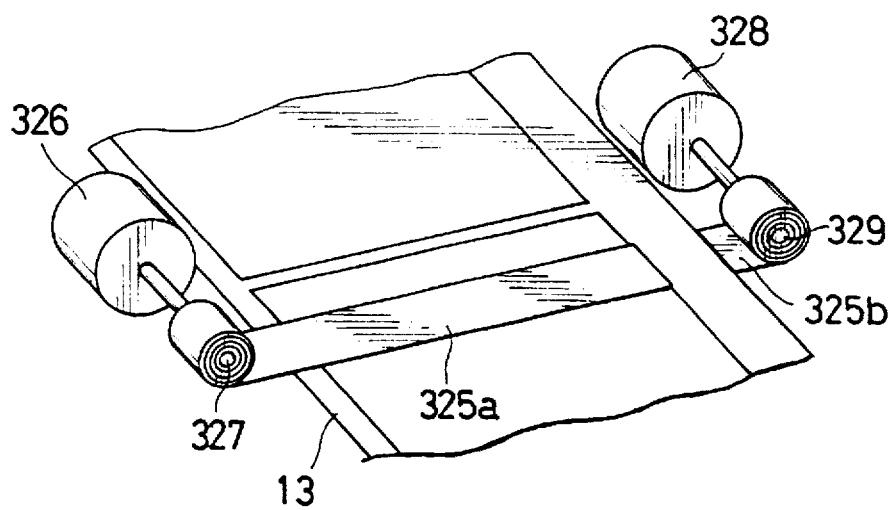
FIG. 4 is a view of one form of the exposing head portion of FIG. 2.
Figure 5:
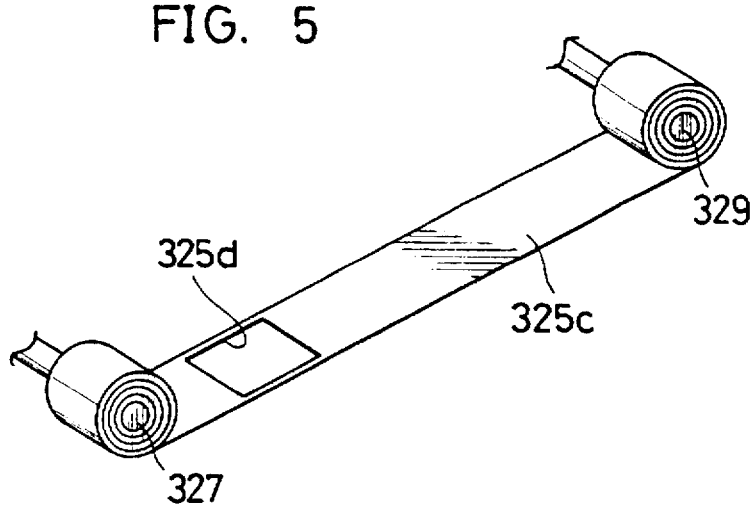
FIG. 5 is a view of another form of a light shielding mask.

To bare the other widthwise end portion of the rolled photographic paper 13 and shield the remaining part, only the first mask member 325a is required to be drawn out from the roller 327, as shown in FIG. 4. Note that at first glance of FIG. 4, the first mask member 325a and the second mask member 325b appear to be in a single member; however, these two members 325a, 325b are separated from each other and independently controlled by the respective motors 326, 328. Further, for example, to bare a widthwise intermediate part of the rolled photographic paper 13 with the remaining part shielded, the first and second mask members 325a, 325b may be drawn out from the both rollers 327, 329 to define a bare space between the front ends of the first and second mask member 325a, 325b, though such an illustration is not given here. Further, a third mask member 325c wound on the both rollers 327, 329 may be provided with an exposing window 325d, as shown in FIG. 5, to eliminate the need for the mask member to be separated into the first mask member 325a and the second mask member 325b. In this modification, the third mask member 325c may be provided, at its different portions, with a plurality of exposing windows 325d each having a different size, to better meet the needs of baring portions of different width.

Figure 6:
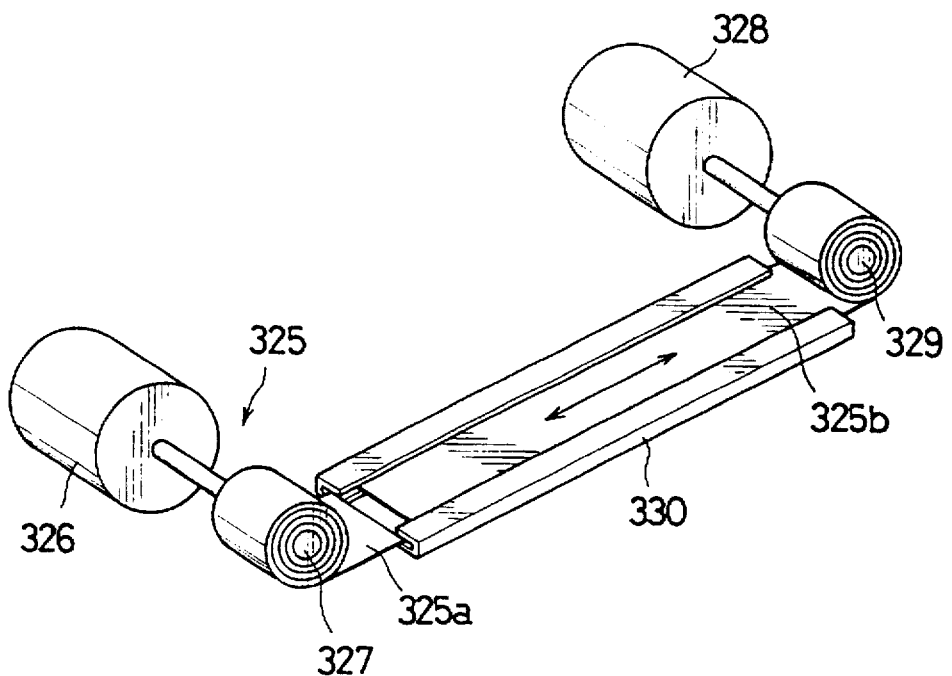
FIG. 6 is a view of a mask guide for the light shielding mask.

Further, to facilitate the drawing operation and rewinding operation of the first and second mask members 325a, 325b, a mask guide 330 as shown in FIG. 6 may be mounted on a lower surface of the shutter array 321. There is an interval of about 10 mm between the lower surface of the shutter array 321 and the rolled photographic paper 13, so that the mask guide 330 can be easily mounted on the lower surface of the shutter array 321. Moving the first and second mask members 325a, 325b along grooves provided at both lateral sides of the mask guide 330 facilitates the drawing operation and rewinding operation of the first and second mask members 325a, 325b. The driving motors 326, 328 are controlled to be synchronous with each other via the exposure controlling section 34.

The exposing head controlling section 33, which controls the drive of the exposing head portion 32 as mentioned above, comprises the color filter controlling section 331 and the image data output controlling section 332. The color filter controlling section 331 controls rotation of a driving motor 331a to regulate the rotational drive of the disc-like color filter 323. The image data output controlling section 332 permits the driving voltage to be applied to the shutter portions of the shutter array 321 to open the shutter portions corresponding to specific picture elements. This allows the color light, which is delivered from the disc-like color filter through the bundles of optical fibers 324, to be output onto the rolled photographic paper 13 to expose the rolled photographic paper 13 to the color light.

The exposure controlling section 34 controls synchronously the second photographic paper transporting section 31 and the exposing head controlling section 33, on the basis of the image data delivered from the line buffer 22, as mentioned above, to allow a photographic image corresponding to that in each frame, such as a photo shooting date and the like, to be precisely exposed on the rolled photographic paper 13.

The developing section 40 includes a liquid tank 41 which is filled with a developing solution. The rolled photographic paper 13 exposed by the exposing head portion 32 is transported by an exposed photographic paper transporting section, not shown, provided at a position downstream from the liquid tank 41 and is immersed into the developing solution in the liquid tank 41 to emerge or produce a visible image from a latent image produced by exposing the rolled photographic paper 13.

The cutting section 50 comprises a cutter 51 to cut the rolled photographic paper 13, which was developed in the developing section 40 and then dried, in the widthwise direction. The rolled photographic paper 13, transported to the cutting section 50 by a developed photographic paper transporting section (not shown) provided at a position upstream from the cutter 51, is cut into each individual frame.

The cutter 51 comprises an upper wedge-like cutting edge 511 and a lower wedge-like cutting edge 512 which are located above and below the rolled photographic paper 13. The upper cutting edge 511 and the lower cutting edge 512 stays apart from each other until a related part of the rolled photographic paper 13 comes to a cutting position. When the related part of the rolled photographic paper 13 comes to the cutting position, the upper and lower cutting edges 511, 512 move past the rolled photographic paper 13 each other to cut the photographic paper 13 in the widthwise direction. The cutter 51 is provided with a driving motor 513 for driving the upper and lower cutting edges 511 and 512 up and down and a cutter controlling section 514 for controlling the drive of the driving motor 513.

The system controller 60 includes a CPU and a ROM storing a control program, not shown, and performs a centralized control on operations of the controlling sections by giving a command to each of the controlling sections in accordance with the control program.

Next, a brief explanation of the operations on the automatic photo printing system will be given below.

First, in the first exposing section 10, based on the command from the system controller 60, the photographic images of the negative film 11 transported by the film transporting section 12 are sequentially exposed one by one on the rolled photographic paper 13 by actuating the shutter 153 or the like.

Then, in the image data capturing section 20, previously captured image data for each frame, such as a photo shooting date and the like, which are to be exposed in the second exposing section 30, are read from the frame data storage section 21 and then are delivered to the line buffer 22 by one line at a time. In the exposure controlling section 34, each line of image data is read from the line buffer 22 to deliver the read image data to the exposing head controlling section 33.

Also, in the exposure controlling section 34, the movement of the first and second mask members 325a, 325b forming the light shielding mask 325 is controlled to shield the area of the rolled photographic paper 13 exposed in the first exposing section 10. In the exposing head controlling section 33, the disc-like color filter 323 is controlled by the color filter controlling section 331 to be rotated at a constant speed, and the drive of the shutter array 321 is controlled by the image data output controlling section 332, thereby allowing an area of the photographic paper 13 uncovered with the light shielding mask 325 to be exposed.

After the exposure on the basis of one line of image data is completed, the second photographic paper transporting section 31 is actuated under control of the exposure controlling section 34 to transport the rolled photographic paper 13 downstream by a length corresponding to the next one line to be exposed. And, subsequent exposure on the basis of the next one line of image data is started. Thus, the exposure controlling section 34 synchronizes the time required for one line to be exposed by the exposing head portion 32 with the rate at which the rolled photographic paper 13 is transported, for completion of the exposure of the photographic image to be exposed on the area of the rolled photographic paper 13 uncovered with the light shielding mask 325.

The rolled photographic paper 13, after exposed in the first exposing section 10 and the second exposing section 30, is transported in sequence into the developing section 40 and is developed with the prescribed developing solution. And, the rolled photographic paper 13, after dried, is transported into the cutting section 50, in which the rolled photographic paper 13, which was long before the exposure, is cut along the widthwise direction into each individual frame.

In the above-mentioned embodiments, the exposing head portion 32 includes the shutter array 321 formed by the PLZT element, the white light source 322, the disc-like color filter 323, the bundles of optical fibers 324 and the light shielding mask 325. In place of the shutter array 321 formed by the PLZT element, a liquid crystal display (LCD) or equivalent may be used. This modified exposing head portion can also provide the same exposure as the one using the shutter array 321 formed by the PLZT element. Further, the disc-like color filter 323, which provides color exposure, is not indispensable for monochrome exposure. Also, light sources of three colors of R, G, B may be used for the color exposure, instead of the disc-like color filter 323.

Further, in the above-mentioned embodiments, the light shielding means, for shielding the area of the photographic paper exposed in the first exposing section 10 from the light leaked from the shutter array 321, is formed by the light shielding mask 325 only. These embodiments may be so modified, as shown in FIG. 7, that in addition to the light shielding mask 325, there is provided a light shielding mask 70 which extends all along the widthwise dimension of the rolled photographic paper 13 and is so constructed as to be movable along the transporting direction.

The light shielding mask 70 comprises a fourth mask member 71 made of a metallic plate or equivalent extending along the widthwise direction of the rolled photographic paper 13, and control solenoids 72, 73 mounted on opposite ends of the fourth mask member 71, respectively. The control solenoids 72, 73 allow the fourth mask member 71 to be shifted between a position downstream from the shutter array 321 and a position under the lower surface of the shutter array 321. The shift is controlled synchronously by the exposure controlling section 34. When the fourth mask member 71 is shifted to the position under the lower surface of the shutter array 321, it comes to be inserted into a space under the lower surfaces of the first and second mask members 325a, 325b, to shield the full widthwise area of the rolled photographic paper 13 directly under the shutter array 321 from the light leaked from the shutter array 321.

Alternately, the shutter array 321 may be so constructed as to move along the transporting direction to be able to position over the fourth mask member 71.

Figure 7:
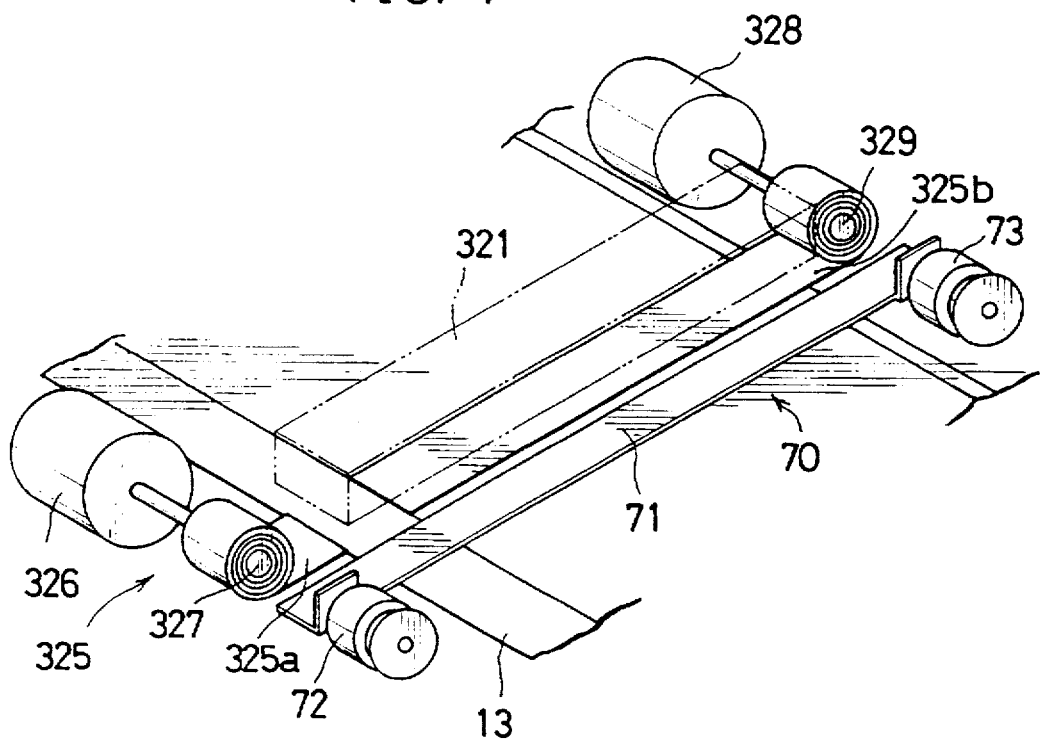
FIG. 7 is a view of another form of the exposing head portion of FIG. 2.

In the modified embodiment shown in FIG. 7, when the exposure onto the rolled photographic paper 13 is made in the second exposing section 30, the area of the photographic paper exposed in the first exposing section 10 is shielded from the light leaked from the shutter array 321 by the light shielding mask 325. On the other hand, when the exposure onto the rolled photographic paper 13 is not made in the second exposing section 30, the full widthwise area of the photographic paper is shielded from the light leaked from the shutter array 321 by the light shielding mask 70. Thus, the fourth mask member 70 can selectively be used depending on the exposing conditions.

Figure 8:
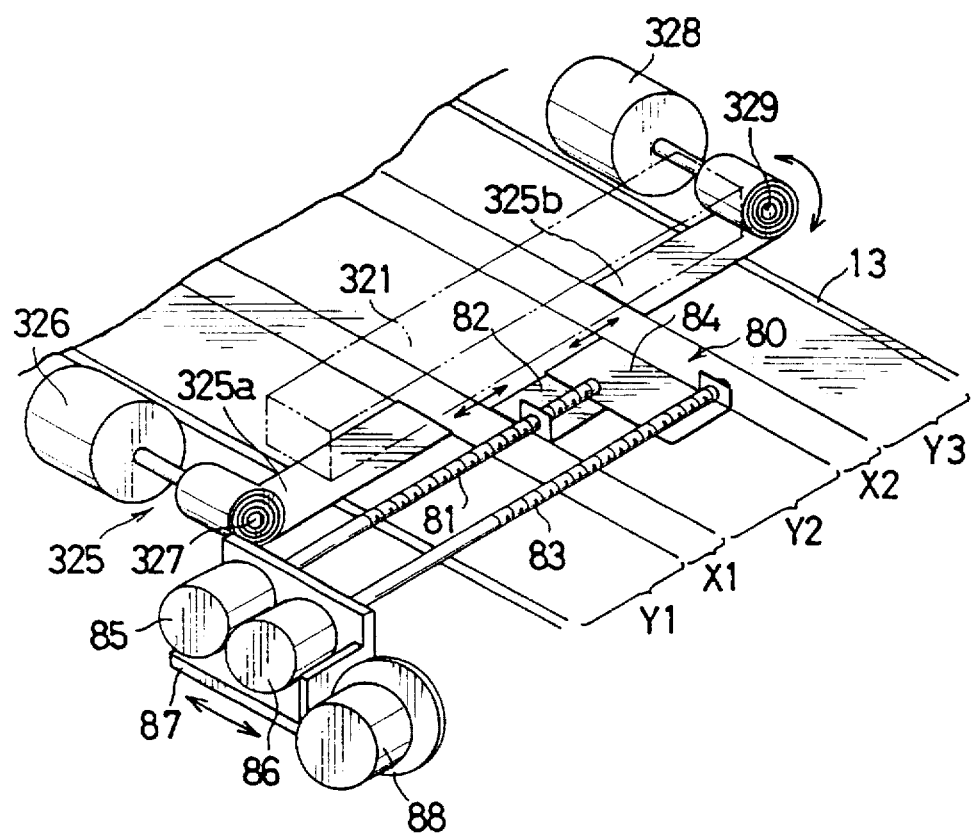
FIG. 8 is a view of still another form of the exposing head portion of FIG. 2.

Further, as shown in FIG. 8, in addition to the light shielding mask 325, another light shielding mask 80 may alternatively be provided, which is located at a widthwise central portion of the rolled photographic paper 13 and is so constructed as to be movable both in the widthwise direction and in the longitudinal direction of the rolled photographic paper 13. The light shielding mask 80 is located at a position downstream from the light shielding mask 325. The use of these two light shielding masks 80, 325 together will result that in a case where there are two different areas X1 and X2 of the rolled photographic paper 13 to be exposed in the second exposing section 30, the remaining areas Y1, Y2 and Y3, which were exposed in the first exposing section 10, can be shielded from the light leaked from the shutter array 321.

More specifically, the light shielding mask 80 comprises a fifth mask member 82 which is a light shielding member screwably mounted on a screw thread 81 elongated along the widthwise direction of the rolled photographic paper 13, and a sixth mask member 84 which is a light shielding member screwably mounted on a screw thread 83 disposed in parallel to and downstream from the screw thread 81. The fifth mask member 82 has an elongated shape extending along the widthwise direction of the rolled photographic paper 13. The sixth mask member 84 has an elongated shape extending along the longitudinal direction of the rolled photographic paper 13 and is able to overlap with the fifth mask member 82 at the one end portion thereof.

The screw thread 81 is rotated with a rotational drive of a driving motor 85, to which an end portion of the screw thread 81 is connected, to allow the fifth mask member 82 to be moved toward both widthwise ends of the rolled photographic paper 13. The screw thread 83 is rotated with a rotational drive of a driving motor 86, to which an end portion of the screw thread 83 is connected, to allow the sixth mask member 84 to be moved toward both widthwise ends of the rolled photographic paper 13.

The driving motors 85, 86 are mounted on a movable stage 87 which is so constructed as to be moved by a control solenoid 88 in the longitudinal direction of the rolled photographic paper 13. The movement of the movable stage 87 allows the fifth mask member 82 and the sixth mask member 84 to be shifted between a position downstream from the shutter array 321 and a position under a lower surface of the shutter array 321. When the fifth mask member 82 and the sixth mask member 84 are shifted to the position under the lower surface of the shutter array 321, they come into positions under lower surfaces of the first and second mask members 325a, 325b.

This constructed light shielding mask 80 permits the fifth mask member 82 and the sixth mask member 84 to be partially overlapped with each other at the widthwise central portion of the rolled photographic paper 13, as shown in FIG. 8. With overlapped with each other, the fifth and sixth mask members 82, 84 are moved to the location under the lower surface of the shutter array 321 to shield the area Y2 of the rolled photographic paper 13. And, the first and second mask members 325a, 325b of the light shielding mask shield the areas Y1 and Y3 of the rolled photographic paper 13, respectively. As a result of this, the areas X1 and X2 of the rolled photographic paper 13 are bared so that they may be exposed in the second exposing section 30.

If the fifth mask member 82 and the sixth mask member 84 are formed to have such a shape that a widthwise dimension of the rolled photographic paper 13 can be reduced to, for example, approximately one-half the original widthwise dimension of the photographic paper 13, the light shielding mask 325 having the function as mentioned on the FIG. 2 embodiment and its variants may be replaced with this type light shielding mask 80.

Figure 9:
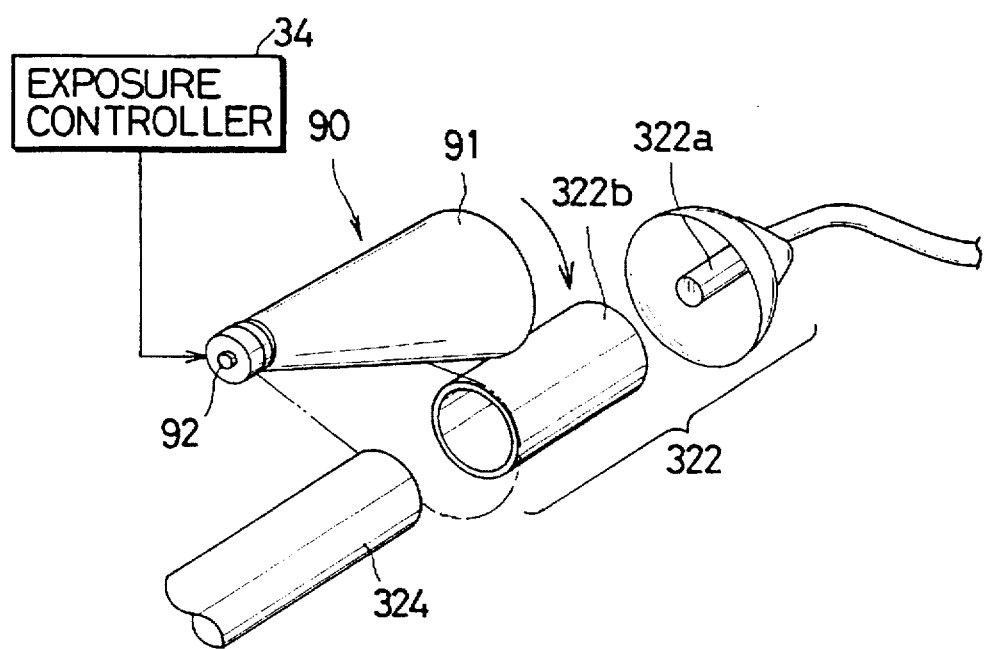
FIG. 9 is a view of another construction of the light shielding mask.

Further, any of the above-mentioned light shielding masks 325, 70 and 80 is so designed as to allow the optical path formed between the white light source 322 and the rolled photographic paper 13 to be opened and closed by the light shielding mask at a position between the shutter array 321 and the rolled photographic paper 13. In addition to the light shielding mask 325, 70 or 80, there may be provided an additional light shielding mask 90 for allowing the optical path to be opened and closed at a position between the white light source 322 and the shutter array 321, as shown in FIG. 9.

The light shielding mask 90 comprises a seventh mask member 91 which is a light shielding member made of a metallic plate or equivalent. The light shielding mask 90 is disposed between a white light source 322 including a tungsten halogen lamp 322a and a mirror tunnel 322b, and bundles of optical fibers 324 through which light is delivered to the shutter array 321, to shield the optical path therebetween. The seventh mask member 91 is so constructed as to be moved between the optical path and its evacuating position by a solenoid 92 which is attached to one end portion of the seventh mask member 91. The solenoid 92 is controlled synchronously by the exposure controlling section 34.

The provision of the light shielding mask 90 together with the light shielding mask 325 or equivalent will result in that when the rolled photograph printing paper 13 is stopped being transported for a given time, while the white light source 322 remains in on state, the delivery of light to the shutter array 321 can be completely blocked by shielding the optical path from the white light source 322 by use of the light shielding mask 90. This results in ceasing leakage of light from the shutter array 321. Thus, a possible risk of the rolled photographic paper 13 being exposed accidentally can surely be avoided.

The above-mentioned embodiments, in which the image data are read from the frame data storage section 21 of the image data capturing section 20 and are exposed on the rolled photographic paper 13 in the second exposing section 30, may be modified in such a manner that the image data are captured from an outside device such as a personal computer and are exposed on the basis of the captured image data.

Further, the above-mentioned embodiments, in which the light shielding means for shielding the optical path between the white light source 322 and the rolled photographic paper 13 comprises the light shielding member and the moving means for moving the light shielding member, may be modified in such a manner that for example the liquid crystal display (LCD) is used to electronically open and close the optical path by applying the driving voltage to the liquid crystal display and stopping applying the driving voltage to the same.

Although the present invention has been fully described by way of examples with reference to the accompanied drawings, it is to be understood that various changes and modifications will be apparent to those skilled in the art without departing from the spirit and scope of the present invention. Accordingly, the invention should not be limited by the foregoing description but rather should be defined only by the following claims.

What is claimed is:

1. A photographic image exposing apparatus comprising:
   transporting means for transporting a photographic paper in a fixed direction;
   a first exposing section, provided at a position over a transporting path of the photographic paper, for projecting a photographic image of a negative film on a first area of the photographic paper to expose the photographic image thereon; and
   a second exposing section, provided at a position over said transporting path of the photographic paper, for exposing a photographic image captured as image data on a second area of the photographic paper different from said first area of the photographic paper exposed by the first exposing section, said second exposing section having
   a light source;
   an exposing head for outputting light of said light source onto the photographic paper to expose the photographic image thereon;
   and
   light shielding means for opening and closing an optical path between said light source and said exposing head.

2. The photographic image exposing apparatus according to claim 1, wherein said light shielding means comprises a light shielding member and moving means for allowing said light shielding member to be movable into and away from between said light source and said exposing head.

3. The photographic image exposing apparatus according to claim 2 wherein said light shielding means has a second light shielding member and moving means for allowing said second light shielding means to be movable into a space between said exposing head and said photographic paper.

4. A photographic image exposing apparatus comprising:
   transporting means for transporting a photographic paper in a fixed direction;
   a first exposing section, provided at a position over a transporting path of the photographic paper, for projecting a photographic image of a negative film on a first area of the photographic paper to expose the photographic image thereon; and
   a second exposing section, provided at a position over said transporting path of the photographic paper, for exposing a photographic image captured as image data on a second area of the photographic paper different from said first area of the photographic paper exposed by the first exposing section, said second exposing section having
   a light source;
   an exposing head for outputting light of said light source onto the photographic paper to expose the photographic image thereon;
   and
   light shielding means for opening and closing an optical path between said exposing head and said photographic paper.

5. The photographic image exposing apparatus according to claim 4, wherein said light shielding means comprises a light shielding member and moving means for allowing said light shielding member to be movable into a space between said exposing head and said photographic paper, said light shielding member being adapted to be movable along a widthwise direction of the photographic paper intersecting a transporting direction of the same, to shield said first area of the photographic paper exposed by the first exposing section against light.

6. The photographic image exposing apparatus according to claim 4, wherein said light shielding means comprises a light shielding member and moving means for allowing said light shielding member to be movable into a space between said exposing head and said photographic paper, said light shielding member being adapted to be movable along a longitudinal direction of the photographic paper extending along a transporting direction of the same, to shield said first area of the photographic paper exposed by the first exposing section against light.

* * * * *